United States Patent
Neuhaus et al.

(10) Patent No.: US 7,263,352 B2
(45) Date of Patent: Aug. 28, 2007

(54) METHOD FOR PROVIDING RESOURCES FROM A FIRST COMPONENT TO A SECOND COMPONENT IN A COMMUNICATION NETWORK

(75) Inventors: Ralf Neuhaus, Lünen (DE); Rainer Uecker, Mülheim (DE)

(73) Assignee: Siemens Aktiengesellschaft, Munich (DE)

( * ) Notice: Subject to any disclaimer, the term of this patent is extended or adjusted under 35 U.S.C. 154(b) by 126 days.

(21) Appl. No.: 10/525,123

(22) PCT Filed: Jul. 31, 2003

(86) PCT No.: PCT/DE03/02578

§ 371 (c)(1),
(2), (4) Date: Feb. 18, 2005

(87) PCT Pub. No.: WO2004/021182

PCT Pub. Date: Mar. 11, 2004

(65) Prior Publication Data

US 2006/0136547 A1    Jun. 22, 2006

(30) Foreign Application Priority Data

Aug. 22, 2002   (DE) ................. 102 38 546

(51) Int. Cl.
*H04M 3/00* (2006.01)
(52) U.S. Cl. .............. 455/419; 455/418; 455/420; 455/435.1; 455/464; 370/352; 370/401; 709/202; 709/203; 709/219; 709/223; 713/155
(58) Field of Classification Search ............ 455/418, 455/419, 420, 435.1, 464; 370/352, 401; 709/202, 203, 223, 219; 707/10; 713/155
See application file for complete search history.

(56) References Cited

U.S. PATENT DOCUMENTS

| | | | |
|---|---|---|---|
| 5,752,042 A | 5/1998 | Cole et al. | |
| 5,761,380 A | 6/1998 | Lewis et al. | |
| 6,023,727 A | 2/2000 | Barrett et al. | |
| 6,816,882 B1 * | 11/2004 | Conner et al. | 709/203 |
| 7,035,918 B1 * | 4/2006 | Redding et al. | 709/223 |
| 2002/0107809 A1 * | 8/2002 | Biddle et al. | 705/59 |
| 2002/0143801 A1 * | 10/2002 | Okamoto et al. | 707/203 |
| 2002/0161718 A1 * | 10/2002 | Coley et al. | 705/59 |
| 2002/0169625 A1 * | 11/2002 | Yang et al. | 705/1 |

FOREIGN PATENT DOCUMENTS

| | | |
|---|---|---|
| EP | 0 964 334 A2 | 12/1999 |
| GB | 2 346 989 A | 8/2000 |
| JP | 11212793 A | 8/1999 |
| JP | 11282686 A | 10/1999 |
| JP | 2001092779 A | 4/2001 |
| US | GB-2346989 * | 8/2000 |
| WO | WO98/36543 | 8/1998 |
| WO | WO 01/84792 A1 | 11/2001 |

* cited by examiner

*Primary Examiner*—Steve M. D'Agosta

(57) ABSTRACT

In one aspect, a method is provided for providing resources provided in a first communication component to a second communication component, the components in a packet-switched communication networks. The resources being provided by software which runs on the communication components and which accesses the hardware of the communication components. A service examines the hardware of at least one of the communication components in order to determine whether a resource can be provided by a software on said communication component. If the result is positive, the resource-specific software is transmitted to the communication component and provides the resource to be used.

19 Claims, 2 Drawing Sheets

METHOD FOR PROVIDING RESOURCES FROM A FIRST COMPONENT TO A SECOND COMPONENT IN A COMMUNICATION NETWORK

CROSS REFERENCE TO RELATED APPLICATIONS

This application is the US National Stage of International Application No. PCT/DE2003/002578, filed Jul. 31, 2003 and claims the benefit thereof. The International Application claims the benefits of German application No. 10238546.7 filed Aug. 22, 2002, both applications are incorporated by reference herein in their entirety.

FIELD OF THE INVENTION

The invention relates to a method for providing resources in communication networks.

BACKGROUND OF THE INVENTION

Communication networks whose components communicate with one another on a packet-switched basis are replacing circuit-switching communication networks to an increasing extent. Such networks are frequently also referred to as Voice Over IP (VoIP for short) networks when the Internet protocol (IP) is used for interchanging the audio information provided in the form of data. In this case, the networks may either be used exclusively for transmitting voice data or else for transmitting a mixture of voice data and other information.

The interconnected devices arranged in communication networks are referred to generally as communication components. When a communication component of this type is used as a terminal, for example as a telephone or a multimedia terminal, this component is also referred to as a client component. Other components are not used as a terminal, but rather provide services in the communication network. The services may be a gateway functionality, a voice mail server, an address directory or the like, for example. Such communication components are also referred to as server components. The services and functions provided by the server components are frequently referred to as resources in the literature.

Both the client components and the server components normally comprise a piece of computer hardware (for example a PC) which uses appropriate hardware extensions and a piece of adapted software to perform appropriate functionalities. In this case, a piece of computer hardware may also have more than one software application installed on it, which means that a single physical component in the network may in principle exercise both client and server functionalities. Such communication components are also referred to as servents in the literature, an artificial word derived from the terms "client" and "server".

The communication components connect to one another by interchanging addressed data packets with one another. In this case, each communication component in the packet-switching network has a network address which is uniquely associated with it. In the networks which interchange data on the basis of the Internet protocol (IP networks), this is the IP address and the IP port number, for example. If a communication component is intended to connect to or interchange data with another communication component, then it is first necessary to find out the network address of the other component. The network addresses are not always permanently associated with the communication components over time, but rather may also be allocated dynamically in the network, which means that communication components may each have a different address whenever they have been turned off and turned on again or after predetermined events. For this reason, at least one network component in the known packet-switching communication networks is equipped with an address directory (address database) for all of the communication components which are available in this network. These server components are normally referred to as gatekeepers.

Alternatively, data interchange without a central address database in the manner of a gatekeeper is known, for example using "The Gnutella Protocol Specification V 0.4" method, which communication components on the Internet can automatically use to find other communication components for file interchange. In this case, the file and hence data interchange thus takes place not using a central server component or a "gatekeeper", but rather directly between the individual components. Networks which provide direct data interchange between communication components without a superordinate entity are called Peer-to-Peer networks. The communication components which comprise functionalities both of "clients" and of "servers" are the aforementioned "servents".

In the Peer-to-Peer network based on the Gnutella specification, each communication component (for example a PC) holds files ready for interchange with other components. In order to be able to interchange data, the searching component requires the network address of the component which holds the sought file ready for retrieval. To this end, it first of all sends a first search message, the "ping". Communication components which receive a "ping" search message respond to the searching communication component using a hit response, the "pong". This hit response contains the respective network address of the responding communication component and the number of files which this component provides for interchange. In the next step, the searching component sends a second search message "Query" to a limited selection of those communication components which have responded to the "ping" search message with a "pong". The second search message already contains the file name of the file which is being sought. If a component receives a second search message "Query" but does not itself hold the sought file ready for interchange, then it forwards this search message to other communication components in the network whose addresses it has ascertained, for example by means of a "ping" method which has already been carried out in the past. If the communication component can provide the desired file for interchange, however, then it responds to the second search message "Query" with a hit response "Query Hit", as a result of which the searching communication component can initiate the file transfer using commands defined in the Internet protocol.

The Gnutella method is used when a particular file is being sought among other communication components. The search method is terminated at the very instant at which the sought file has been found for the first time.

While the correct file need only be found once when searching on the basis of the Gnutella method, it is frequently important in the case of the services in communication networks—the resources—to gain access to a plurality of resources of the same type in order to be able to choose between them when required. This case frequently arises with gateways, for example, which provide the client components in packet-switching networks with connections to components in circuit-switching communication networks. In this context, the client components in a packet-switching communication network require the use-related information about a plurality of resources of this type, because the gateways always support only a limited number of communication connections at the same time in line with their number of channels. Hence, if a gateway is already being utilized to the full extent or has failed, it is necessary to be able to move to another gateway. To this end, the client components or a central location in the network store lists containing the addresses of a plurality of gateways. In searching for a free gateway, that is to say one which is not yet fully utilized, a client component successively contacts all gateways which are held on the list until a gateway with sufficient (residual) capacity has been found. Such lists containing the available resources in the network are administered from a central location in the network. In the event of changes to the network topology or in the event of changes relating to the available resources, the list is changed and is then made available to the client components again in updated form.

In the packet-switching communication networks customary today, the resources are usually software applications which run on PC hardware. In this case, a plurality of resources may also have been installed on one common piece of PC hardware. The software applications access installed hardware components of the PC. By way of example, ISDN cards are used for connections to the circuit-switching communication network ISDN, sound cards are used for inputting and outputting audio information etc. As soon as a PC has the respective hardware components, it can provide the desired resource in the network for use by the other communication components in the communication network by installing an appropriate piece of software.

The document EP 0 964 334 A2 McNally et al. "System, method and computer program product for resource discovery in a distributed computing environment" shows an arrangement and a method for finding and using resources in computer networks. In this case, search programs ("discovery agents") are sent in the computer network which are placed in the computers for execution and which search these computers for characteristics (hardware, software) which are a requirement for the execution of particular software. If the respective computer's characteristics mean that it has the requirement for executing the software in question, this software is transferred to the computer and is executed there, which means that the computer then provides the resource formed by the software in the computer network.

The known communication networks have been found to have the drawback that resources are not available in a required number in the network. Permanently monitoring the utilization level of the various resource types, additionally installing further resources and uninstalling excessive resources entail a high level of complexity, which is often manual.

SUMMARY OF THE INVENTION

It is an object of the invention to optimize the provision of resources in networks and at the same time to reduce the complexity for administration in the networks.

This object is achieved by the claims.

To achieve this object, a service, upon use of a resource on a first communication component by a second communication component, checks this second communication component for whether this second communication component can also provide this resource, and if the result of the check is positive it initiates the transfer of this software from the first communication component to the second communication component and provides the resource for use. This copies resources of a frequently used type frequently and sets them up increasingly in the network, these resources provided again using hardware which is already present in the network but has not been used to date. Communication components which are not utilized to the full extent are automatically equipped with software, which means that free capacities can be used appropriately.

The features of the dependent claims advantageously provide further refinements of the invention.

The communication component may be checked permanently as a background process if the service is installed as software on the communication component which is to be checked.

Frequently used resources are increasingly set up in the network by virtue of the service, upon use of the resource on a first communication component by a second communication component, checking this second communication component for whether this second communication component can also provide this resource, and if the result of the check is positive it initiates the transfer of this software from the first communication component to the second communication component.

The communication components are occupied only by resources which are actually used, whereas the software for resources which are used rarely or not at all is deactivated or uninstalled and is reactivated or reinstalled when needed again. In this case, it is possible to define that the last instance of a resource which is present in the network is not uninstalled.

The uncontrolled spread of unwanted resources is prevented by virtue of software being transferred on the basis of authorizations and/or limiting.

If the authorizations are provided by the user of the communication component which transfers the software and/or by the user of the communication component which receives the software, the users themselves make decisions about the type of the use of the communication components.

It is possible to observe licensing limits and to control the number of installed instances of resources by virtue of the limiting being provided by a prescribed maximum number of software licenses on the software which is to be transferred.

In order to update the service, it need be updated by a user at one location only in the communication network if the service formed by a piece of software with a first release compares the release upon finding a second service of the same type which is formed by a piece of software with a second release and, if the releases are different, initiates the transfer of the software with the more up-to-date release to the communication component having the software with the earlier release and uses the transferred software to update the software with the earlier release there.

If the service forms the check automatically at regular intervals of time and/or whenever a resource is used and/or after manual activation, changes in the topology or use of the communication network result in the installed resources being adapted in real time and automatically.

BRIEF DESCRIPTION OF THE DRAWINGS

An exemplary embodiment of an inventive method for providing resources in communication networks is described below with reference to the drawings, in which.

DETAILED DESCRIPTION OF THE INVENTION

Figure 1:
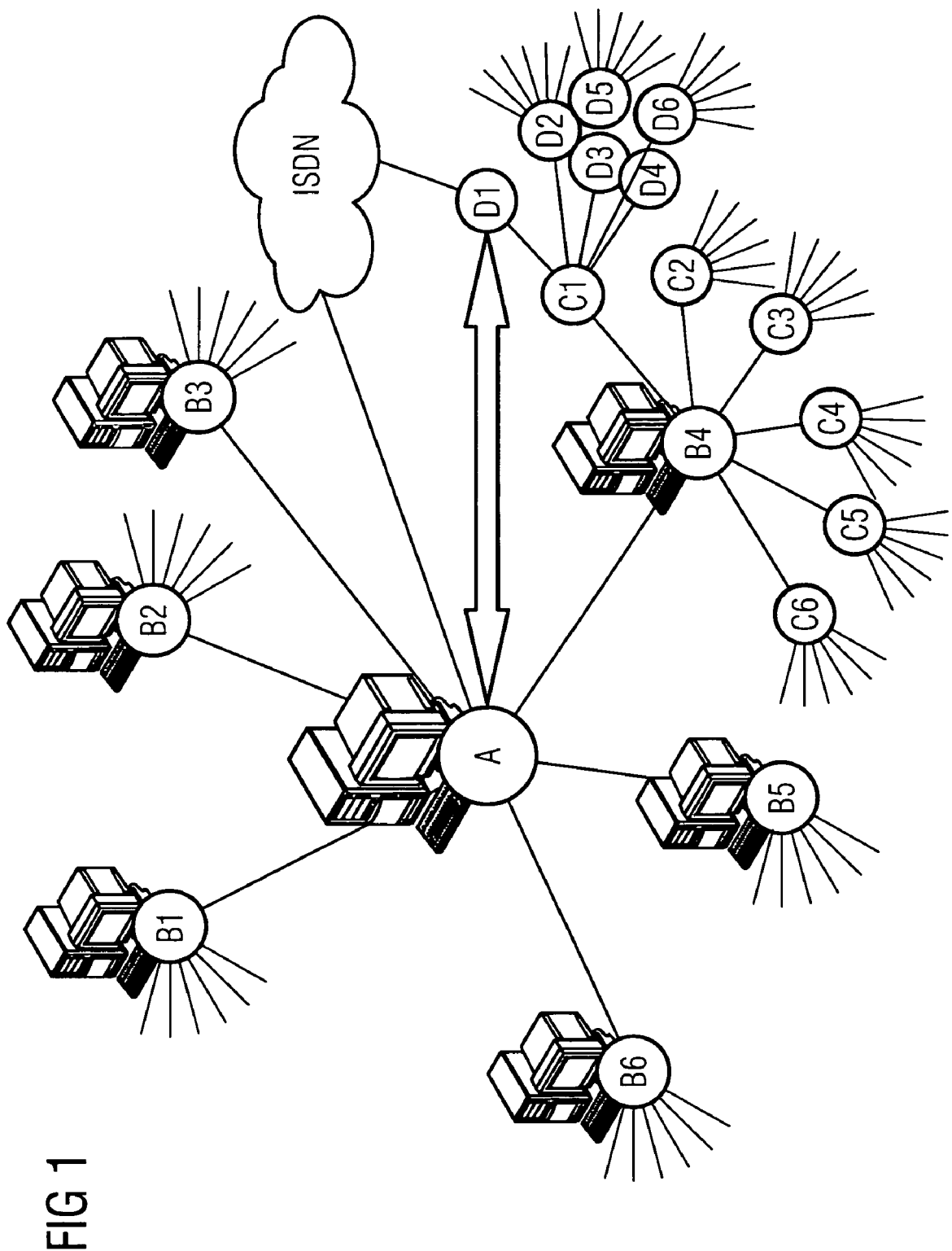
FIG. 1 shows a packet-switching communication network having communication components which is connected to a circuit-switching communication network.

FIG. 1 shows communication components A, B1-B6, C1-C6, D1-D6 which are part of a packet-switching communication network. The connecting lines between the communication components show an example of the way in which the individual communication components A, B1-B6, C1-C6, D1-D6 can interchange data or data packets with one another. In this case, the data interchange takes place directly between the communication components A, B1-B6, C1-C6, D1-D6 independently of the physical topology of the network (for example a ring network, star network or arbitrarily meshed network). As special hardware equipment, the communication components A, D1 have ISDN cards (not shown) which permit connections to a circuit-switching communication network ISDN. Such ISDN cards may be used, by way of example, to provide a "gateway functionality" as a resource.

The communication component D1 has a resource of the gateway type. This resource is formed from a specific piece of software—subsequently also called gateway software—and the ISDN card (already described above) installed in the communication component D1. This ISDN card physically sets up the connection to the circuit-switching communication network ISDN. To this end, the ISDN card is driven by the gateway software.

Figure 2:
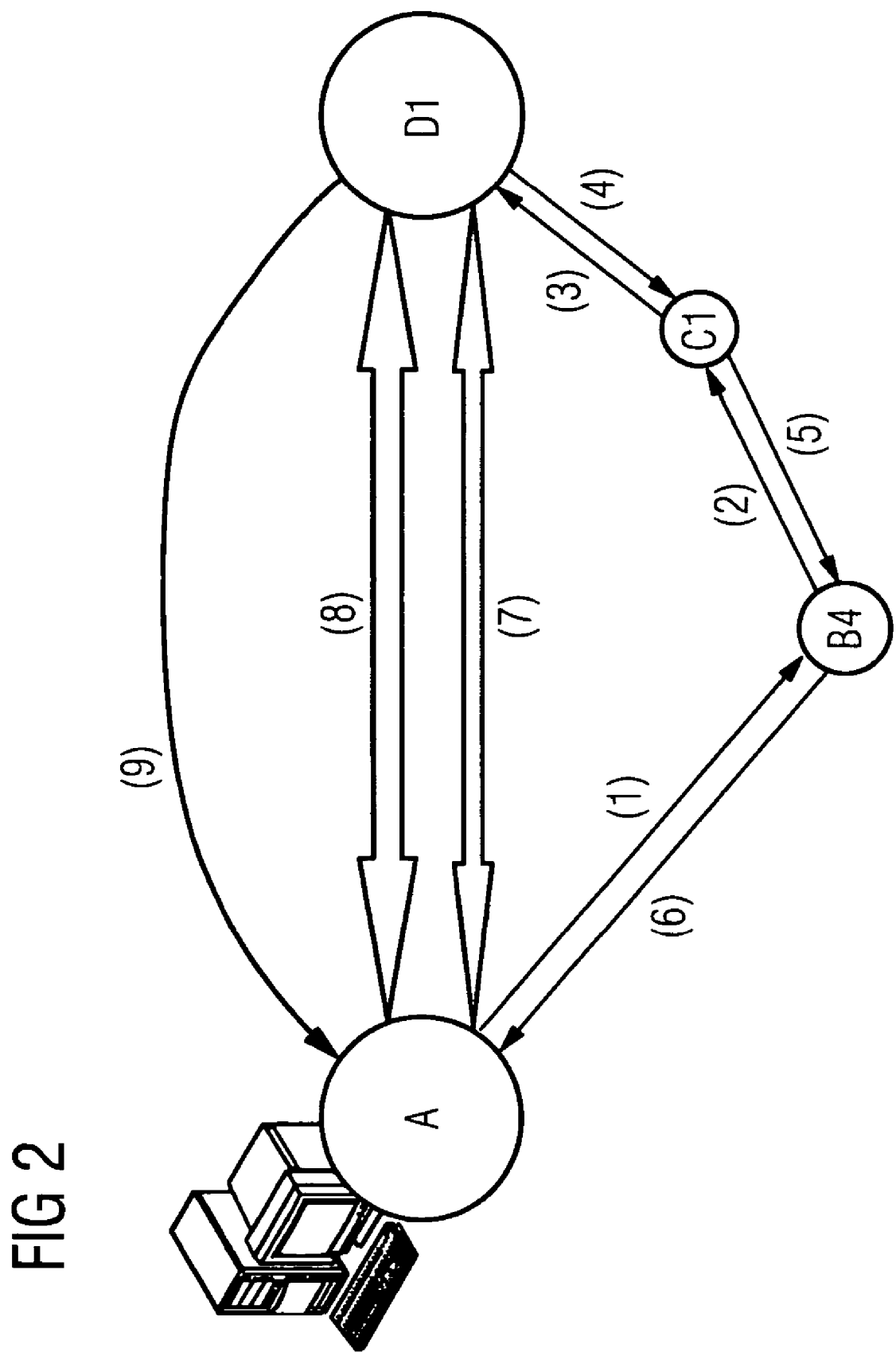
FIG. 2 shows communication components in a packet-switching communication network which interchange resource-specific software.

FIG. 2 describes the sequence for the use of the gateway installed on the communication component D1 by the communication component A. In this case, the numbers (1) to (9) which are associated with the connecting lines and arrows and are shown at the appropriate points in the text below denote successive method steps.

The communication component A searches the packet-switching communication network for a communication component which can provide a gateway to the circuit-switching communication network ISDN as a resource. To this end, the communication component A sends a search message to a "neighboring" communication component B4 which is known to it (1). Besides the proprietary network address of the communication component A, this search message comprises the information that a gateway for a voice connection to the circuit-switching communication network ISDN is being sought. The communication component B4 receiving this search message does not have an appropriate resource of the "Gateway" type. The communication component B4 therefore forwards the search message, with the addition of its own network address, to the "neighboring", communication components C1-C6 which are known to it (2). Since the communication component C1 also cannot provide the desired resource of the "Gateway" type, it for its part forwards the search message to the communication components D1-D6 with the addition of its own network address (3).

The communication component D1 has the desired resource of the "Gateway" type and responds to the communication component C1 with a hit response (4). This hit response comprises the network address of the communication component D1 and also the bandwidth, the type and the number of free channels on the gateway which is being provided. The communication component C1 forwards the hit response to the communication component B4 (5). Finally, the communication component B4 sends the hit response to the searching communication component A (6).

The communication component A uses the information obtained in this manner about the available gateway to set up a direct data connection to the communication component D1 (7). If a plurality of gateways are found in the course of a search, the information sent is used to select one of these gateways.

The packet-switching communication network is a network which operates on the basis of the Internet protocol. In this case, the H.323 protocol, for example, is usual for setting up and executing voice connections. The protocol elements provided in the H.323 protocol are used to set up the previously described connection between the communication components A and D1. Alternatively, it is naturally also possible to use other protocols, for example the SIP (Session Initiation Protocol) protocol. When the connection has been set up, the actual useful data, that is to say the voice data in this case, are transferred from the communication component A to the communication component D1 and from there using the gateway to a subscriber in the circuit-switching communication network ISDN (8).

When the communication component A now has the information that a resource which it needs, namely a gateway, is being provided by the communication component D1, it uses a special request message to ask this communication component D1 for the information regarding what hardware requirements are necessary in order to operate the gateway software used in the communication component D1. This request is initiated by a service which is installed on the communication component A and is permanently active in the background. The communication component D1 responds by indicating that an ISDN card having a CAPI (Common Application Programming Interface—standardized application interface for ISDN communication adapters) driver needs to be installed. The service compares the hardware installed on the communication component A or said hardware's application interfaces with these details and establishes that the minimum requirements for executing the gateway software used on the communication component D1 are likewise met by the hardware of the communication component A.

The result of the software transfer is that a copy of the software is created. The authorization required to do this is checked by reading an authorization file on the communication component D1 for the information regarding which of the communication components A, B1-B6, C1-C6, D2-D6 are authorized, in principle, to transfer software. In the present case, that is all communication components A, B1-B6, C1-C6, D1-D6, which are associated with the same domain. In addition, a license server (not shown) which is installed as a resource on the communication component B6 is asked for the number of licenses which are still free for the gateway software. A prerequisite for authorization is at least one free license. When the software has been transferred, the number of free licenses is reduced by one. The information for authorizing the software transfer can be administered by the user of the communication component D1.

When both the technical requirements and the license-related requirements have been met, the service initiates the transfer of the gateway software from the communication component D1 to the communication component A (9). The gateway software transferred is started, as a result of which the "Gateway" resource is now also provided by the communication component A.

At regular intervals of time—in this example once a day—the service asks the other communication components B1-B6, C1-C6, D1-D6 found in the communication network whether they have the same service installed on them. If this is the case, the service receives from every other communication component B1-B6, C1-C6, D1-D6 with this same service a response message which comprises a version number as information about the release of the software which respectively forms the service from the other communication component B1-B6, C1-C6, D1-D6. The service receiving these response message compares the version numbers with its own version number. If a service from the other communication components B1-B6, C1-C6, D1-D6 has a more recent software release, the service initiates the transfer of the most up-to-date software found to its own communication component A and thus replaces its own software. In cases in which a service from the other communication components B1-B6, C1-C6, D1-D6 has an older software release, the service initiates the transfer of its own software to the other communication component B1-B6, C1-C6, D1-D6, so that the older software is replaced. The gateway software installed on the communication component A records any use of the resource. This is done by keeping a log file. The log file is regularly evaluated by the service. If the resource has not been used for a relatively long time—the time limit is a week in this case—then the gateway software is uninstalled by the service. This frees up storage space again for other installable resources.

The invention claimed is:

1. A method for providing resources in a communication network having communication components, the method comprising:
   providing a service to the communication network via a software running on a communication component, the communication component running the software includes a hardware resource required for use by the software in order to provide the service;
   establishing a connection from a second communication component to the communication component providing the service to the communication network;
   checking the second communication component for the existence of the hardware resource;
   checking that a license is available for the software;
   checking by the communication component running the software to determine if the second communication component is authorized to receive a copy of the software from the communication component running the software; and
   transferring the copy of the software from the communication component running the software to the second communication component in response to a positive check for the existence of the hardware, a positive check for the available license, and a positive check for the authorization.

2. The method as claimed in claim 1, wherein the software is automatically uninstalled in the second communication component after a time period that the service is not used in the second communication component.

3. The method as claimed in claim 1,
   further comprises running the software on the second communication component in response to transferring the software,
   wherein the second communication component includes information of a release of the software,
   wherein after finding a second software running on a third communication component, the second software providing the service, the release of the software on the second communication component is compared with a release of the second software, and
   wherein a copy of the second software is transferred in response to the comparison indicating that the release of the second software is more up-to-date than the software on the second communication component.

4. The method as claimed in claim 3, further comprising:
   checking the second communication component for the existence of a hardware component required by the second software;
   checking that a license is available for the second software; and
   checking by the communication component using the second software to determine if the second communication component is authorized to receive the copy,
   wherein the copy of the second software is transferred in response to a positive check for the existence of the hardware, a positive check for the available license, and a positive check for the authorization.

5. The method as claimed in claim 4, wherein the checking for a more up-to-date release is automatically performed by the second communication component at regular intervals of time.

6. The method as claimed in claim 4, wherein the checking for a more up-to-date release is automatically performed by the second communication component after an activation of the service on the second communication component.

7. The method as claimed in claim 1, further comprises:
   initiating by the second communication component a search for the communication component providing the service; and
   locating the communication component providing the service,
   wherein the connection is established in response to locating the communication component.

8. A method for transferring a software that provides a service in a communication network, the method comprising:
   initiating a search for a communication component that provides the service,
      the communication component provides the service by running the software,
      the search initiated by a second communication component that does not include the software to provide the service, and
      the software requires a hardware resource in order to run the software and to provide the service, thereby the communication component running the software includes the hardware resource;
   establishing a connection from the second communication component to the communication component providing the service
   sending a message from the second component to the communication component providing the service,
      the message requesting for an information identifying the hardware resource required for use by the software in order to provide the service;
   receiving, by the second communication component from the communication component providing the service, a response message having an information identifying the hardware resource;
   checking the second communication component for the existence of a hardware resource based on the information in the response message;
   receiving a copy of the software from the communication component providing the service in response to an existence of the hardware; and providing the service in the second communication component.

9. The method as claimed in claim 8, wherein the copy is received in response to:
the existence of the hardware,
the second communication component being authorized to receive a copy of the copy, and
and a license being available for the copy of the software.

10. The method as claimed in claim 8, wherein the software is automatically uninstalled in the second communication component after a time period that the service is not used in the second communication component.

11. The method as claimed in claim 8, wherein the hardware resource provides a connection with a circuit switched network.

12. The method as claimed in claim 11, wherein the hardware resource is an ISDN card with an interface for ISDN adapters.

13. A method for transferring a software that provides a service in a communication network, the communication network having a first communication component running a first release of the software and a second communication component running a second release of the software, the method comprising:
initiating, by the second communication component providing the service, a search for the first communication component providing the service,
locating the first communication component providing the service;
sending a message from the second component to the first communication component,
the message requesting the first communication component for an information identifying a hardware resource required for use by the software in order to provide the service;
receiving, by the second communication component from the first communication component, a response message having the information identifying the hardware resource;
checking the second communication component for the existence of the hardware resource based on the information in the response message;
comparing the first release to the second release; and
in response to a positive check for the existence of the hardware, and to the comparison indicating that the first release is more up-to-date that the second release:
transferring a copy of the software from the first communication component to the second communication component in response to, and
providing the more up-to-date service by the second communication component.

14. The method as claimed in claim 13, wherein the initiating the search for the first communication component is automatically performed by the second communication component at regular intervals of time.

15. The method as claimed in claim 13, wherein the initiating the search for the first communication component is automatically performed by the second communication component after an activation of the service on the first communication component.

16. The method as claimed in claim 13, further comprises checking by the first component to determine if the second communication component is authorized to receive the copy,
wherein the copy is transferred and the more up-to-date service provided in response to the positive check for the existence of the hardware, to the comparison indicating that the first release is more up-to-date that the second release, and a positive check for the authorization.

17. The method as claimed in claim 16, further comprises checking that a license is available for the software,
wherein the copy is transferred and the more up-to-date service provided in response to a positive check for the existence of the hardware, to the comparison indicating that the first release is more up-to-date that the second release, the positive check for the authorization, and a positive check for the available license.

18. The method as claimed in claim 13, wherein the hardware resource provides a connection with a circuit switched network.

19. The method as claimed in claim 18, wherein the hardware resource is an ISDN card with an interface for ISDN adapters.

* * * * *